US007923979B2

(12) United States Patent
Huang et al.

(10) Patent No.: US 7,923,979 B2
(45) Date of Patent: Apr. 12, 2011

(54) CONTROL SYSTEM FOR DYNAMICALLY ADJUSTING OUTPUT VOLTAGE OF VOLTAGE CONVERTER

(75) Inventors: Po Chiun Huang, Hsinchu (TW); Chun Yen Tseng, Pingtung (TW)

(73) Assignee: National Tsing Hua University, Hsinchu (TW)

( * ) Notice: Subject to any disclaimer, the term of this patent is extended or adjusted under 35 U.S.C. 154(b) by 438 days.

(21) Appl. No.: 11/923,191

(22) Filed: Oct. 24, 2007

(65) Prior Publication Data
US 2008/0224683 A1 Sep. 18, 2008

(30) Foreign Application Priority Data
Mar. 14, 2007 (TW) .............................. 96108691 A

(51) Int. Cl.
*G01F 1/00* (2006.01)
(52) U.S. Cl. ........................................ 323/283; 323/322
(58) Field of Classification Search .................. 323/318, 323/282, 283, 266, 319, 322, 351; 713/320, 713/300, 322, 321
See application file for complete search history.

(56) References Cited

U.S. PATENT DOCUMENTS

| 5,594,324 | A | * | 1/1997 | Canter et al. ................ 323/282 |
| 5,867,376 | A | | 2/1999 | Nakamura et al. |
| 5,905,370 | A | * | 5/1999 | Bryson ........................ 323/283 |
| 6,005,377 | A | * | 12/1999 | Chen et al. .................... 323/283 |
| 6,912,139 | B2 | | 6/2005 | Kernahan et al. |
| 2007/0067069 | A1 | * | 3/2007 | Markowski ................... 700/297 |
| 2007/0210777 | A1 | * | 9/2007 | Cervera et al. ............... 323/284 |

OTHER PUBLICATIONS

Original and Translated version of Second Office Action of Taiwan Intellectual Property Office for corresponding application No. 096108691 issued on Oct. 21, 2010.

* cited by examiner

*Primary Examiner* — Adolf Berhane
*Assistant Examiner* — Nguyen Tran
(74) *Attorney, Agent, or Firm* — Egbert Law Offices PLLC

(57) ABSTRACT

A control system for dynamically adjusting an output voltage of a voltage converter includes a signal calculation circuit, a pulse width modulator, a voltage converter, a nonlinear calibration circuit and a signal converter. The signal calculation circuit, the pulse width modulator, the voltage converter and the signal converter form a long-tail loop. The signal calculation circuit simultaneously receives a target value and a detection value from the signal converter to generate an error value for adjusting the output of the pulse width modulator. The voltage converter and the nonlinear calibration circuit form a local pulse-squashing loop. Pulse widths of an input signal to the voltage converter can be timely and effectively calibrated and controlled, thereby decreasing power consumption of the voltage converter and providing an effective protective mechanism.

19 Claims, 4 Drawing Sheets

CONTROL SYSTEM FOR DYNAMICALLY ADJUSTING OUTPUT VOLTAGE OF VOLTAGE CONVERTER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an output voltage control system for a voltage converter, and more specifically to a control system capable of dynamically adjusting output voltage of a voltage converter.

2. Description of Related Art Including Information Disclosed Under 37 CFR 1.97 and 37 CFR 1.98

Digital control can significantly enhance system performance. Because digital control can support many complex control algorithms or control algorithms that are difficult to be implemented in an analog manner, digital control is quite suitable to digital interfaces controlled by software. Moreover, digital control can decrease the impact of errors of components. For instance, a digital filter can precisely set pole/zero locations within an allowable error range of system clock frequencies. In contrast, pole/zero locations set by analog controller may vary dramatically due to component error.

In comparison with analog pulse width modulation (PWM), digital PWM can generate arbitrary waveforms to drive a voltage converter and is suitable for software schedule control interfaces and programmable flexible operations. Accordingly, digital PWM control will increasingly replace currently prevailing analog PWM control.

Moreover, the output voltages of a voltage converter in a common digital control system are constant, a fact which limits options for related applications. If the output voltage of the voltage converter in a digital control system is dynamically adjustable, then a wider varied applications would be compatible with the digital control system.

BRIEF SUMMARY OF THE INVENTION

The present invention provides a control system for dynamically adjusting an output voltage of a voltage converter, so that the digital control system can be applied to a wider range of products, hardware complexity can be effectively reduced, time delay due to voltage level change and signal processing can be decreased, power consumption of the converter can be decreased, and an effective protection mechanism may be provided.

The control system for dynamically adjusting the output voltage of a voltage converter of the present invention comprises a first control loop and a second control loop. As to the aspect of functionality, the first control loop is a long-tail control loop including a signal processing circuit to synthesize a pulse width modulation signal that is inputted to the voltage converter. The second control loop detects the characteristics of the voltage converter, so as to timely calibrate pulse widths generated by the first control loop, in which the signal processing circuit includes the voltage converter, a signal calculation circuit and a pulse width modulator (PWM). The PWM receives an output signal of the signal calculation circuit and generates the pulse width modulation signal in control of the voltage converter.

More specifically, the control system for dynamically adjusting output voltages of the voltage converter of the present invention includes a signal calculation circuit, a pulse width modulator, the voltage converter, a nonlinear calibration circuit and a signal converter, in which the signal calculation circuit, the pulse width modulator, the voltage converter and the signal converter are connected in series and form the first control loop with negative feedback (a long-tail loop).

The signal calculation circuit simultaneously receives a target value and a detection value of the signal converter, wherein the target value may come from an analog interface or a digital interface. The signal calculation circuit derives an error value by digital signal processing based on a control theorem, so as to adjust outputs of the pulse width modulator. When the target value varies, the voltage converter will generate a different output voltage, so as to dynamically adjust the output voltage of the voltage converter.

The voltage converter and the nonlinear calibration circuit form the second control loop (a local pulse-squashing control loop). The nonlinear calibration circuit detects the characteristics of the voltage converter such as a current to generate a nonlinear calibration signal. Using the nonlinear calibration signal, pulse widths inputted to the voltage converter can be timely and effectively calibrated and controlled. Consequently, the power consumption of the voltage converter can be reduced and effective protective mechanism is provided. Because the nonlinear calibration circuit is not on the signal processing path of the first control loop, the conversion rate is not lowered due to the addition of the nonlinear calibration circuit.

Based on the invention including the long-tail loop and the local pulse-squashing loop, the control system of the present invention can dynamically control the output voltage of the voltage converter.

BRIEF DESCRIPTION OF THE SEVERAL VIEWS OF THE DRAWINGS

The objectives and advantages of the present invention will become apparent upon reading the following description and upon reference to the accompanying drawings.

DETAILED DESCRIPTION OF THE INVENTION

Figure 1:
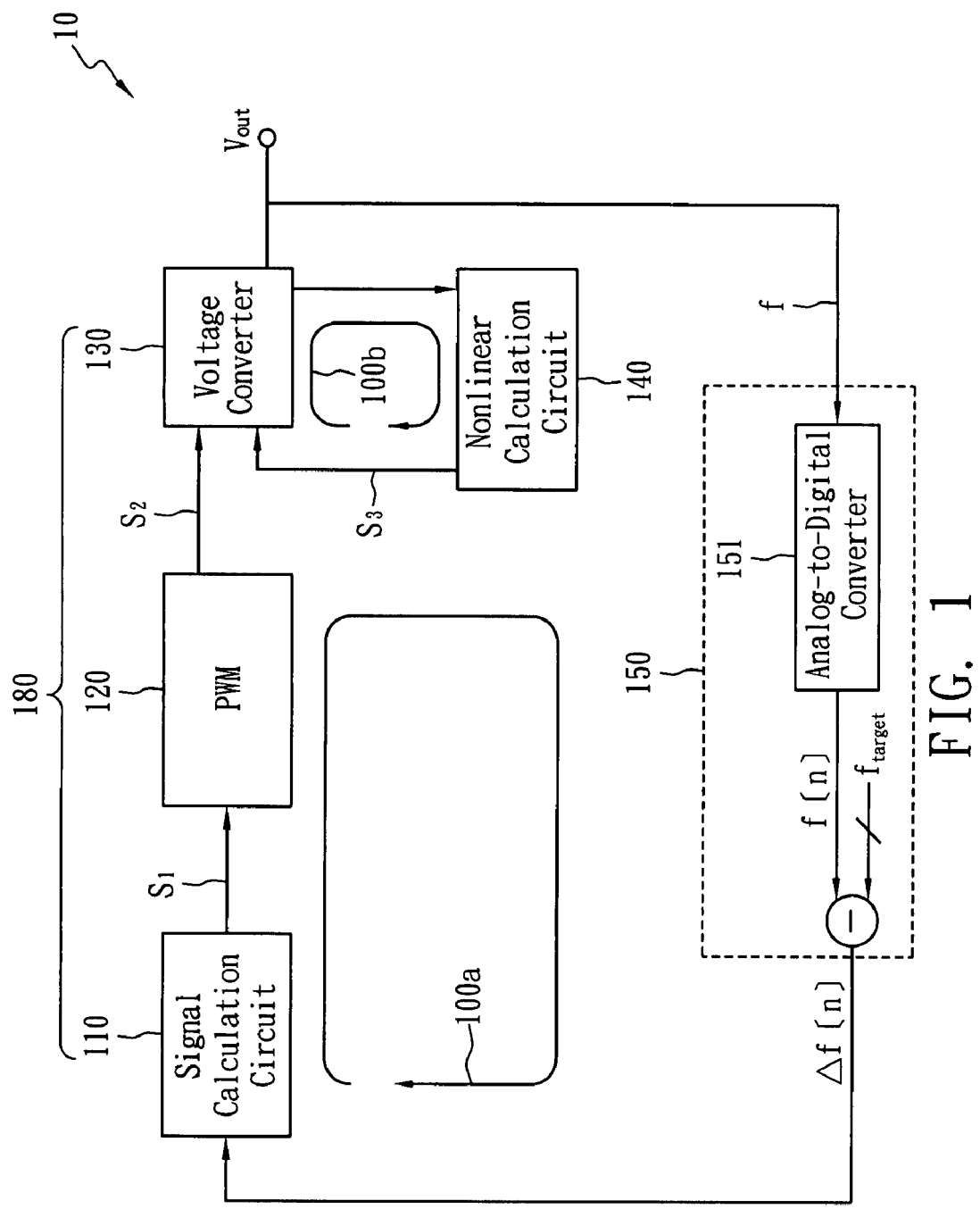
FIG. 1 illustrates a block diagram of the control system for dynamically adjusting an output voltage of a voltage converter in accordance with the present invention.

FIG. 1 illustrates a block diagram of a control system 10 for dynamically adjusting an output voltage of a voltage converter in accordance with the present invention. The control system 10 includes a signal processing circuit 180, a nonlinear calibration circuit 140 and a signal converter 150. The signal processing circuit 180 includes a signal calculation circuit 110, a pulse width modulator 120 and the voltage converter 130.

The pulse width modulator 120 receives an output signal $S_1$ of the signal calculation circuit 110 to generate a pulse width modulation signal $S_2$. The voltage converter 130 receives the pulse width modulation signal $S_2$ to generate an output voltage $V_{out}$. $V_{out}$ is applied to a system load (not shown) and the signal converter 150 as a feedback. The signal converter 150 includes an analog-to-digital converter 151 performing analog-to-digital conversion to an output frequency f of $V_{out}$, so as to generate a digital detection code f[n]. An error signal $\Delta f[n]$, which is a value subtracting a target value $f_{target}$ from the digital detection code f[n], is received by the signal calculation circuit 110 and serves as feedback signal of the control system 10, in which the target value $f_{target}$ comes from an analog interface or a digital interface.

The signal calculation circuit 110, the pulse width modulator 120, the voltage converter 130 and the signal converter 150 are connected in series to form a first control loop 100a (a long-tail control loop) of negative feedback.

The signal calculation circuit 110 generates a modulation error $S_1$ by digital signal processing based on the control theorem, so as to adjust the pulse width modulation signals $S_2$. When the target value $f_{target}$ varies, the voltage converter 130 will generate a different output voltage $V_{out}$, thereby dynamically adjusting the output voltage of the voltage converter.

Moreover, delay time caused by the first control loop 100a can be taken into account while the signal calculation circuit 110 calculates the modulation error $S_1$, so as to enhance control performance of the control system 10.

The voltage converter 130 and the nonlinear calibration circuit 140 form a second control loop (a local pulse-squashing loop) 100b. The nonlinear calibration circuit 140 detects the characteristics of the voltage converter 130, e.g., current, so as to generate a nonlinear calibration signal $S_3$. The voltage converter 130 simultaneously receives the pulse width modulation signal $S_2$ and the nonlinear calibration signal $S_3$ to generate the output voltage $V_{out}$. By introducing the nonlinear calibration signal $S_3$, pulse widths inputted to the voltage converter 130 can be timely and effectively calibrated and controlled. Consequently, the power consumption of the voltage converter 130 can be reduced and an effective protective mechanism is provided.

Figure 2:
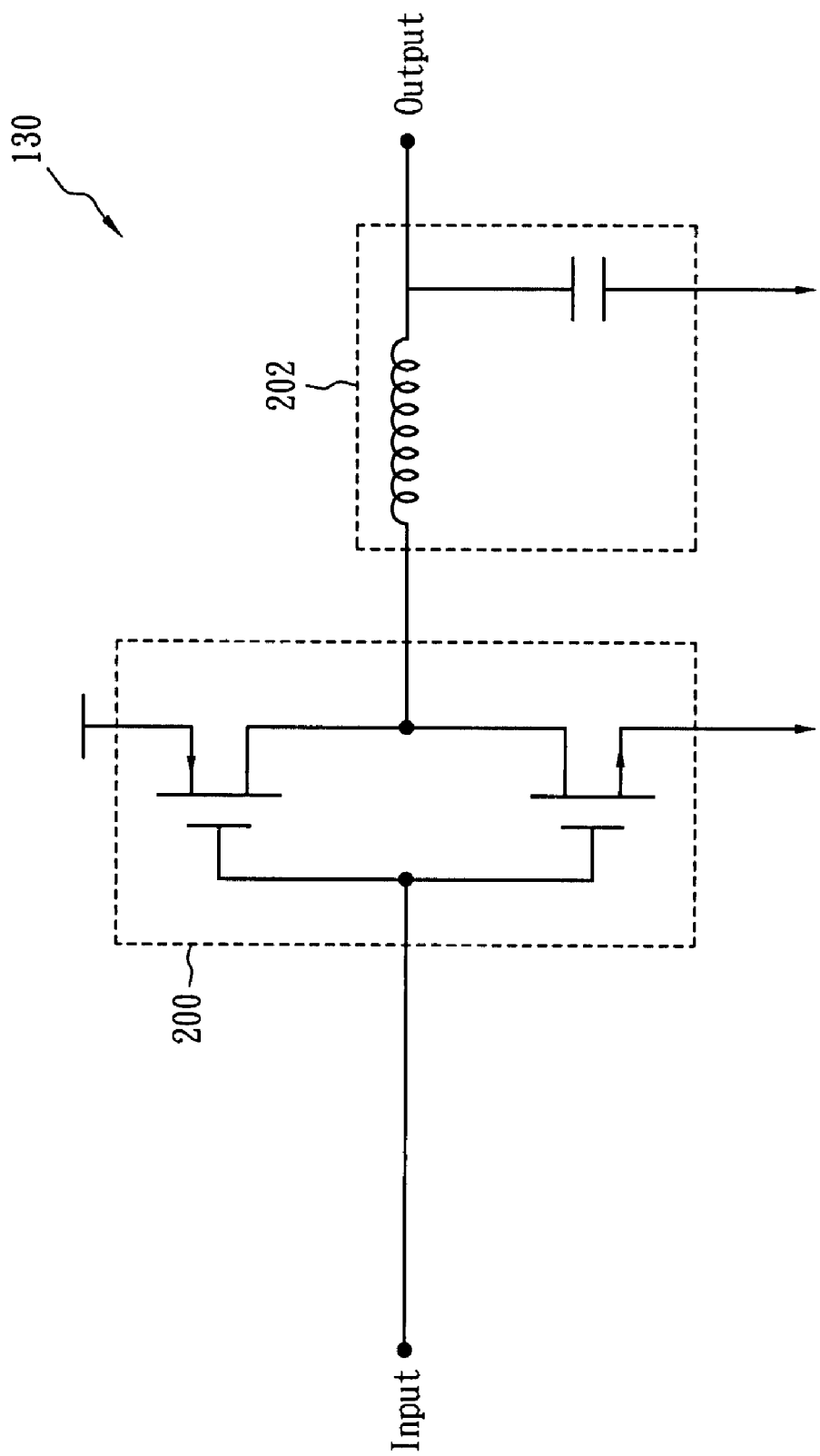
FIG. 2 is a diagrammatic illustration of a switch-mode DC-DC converter of the control system for dynamically adjusting an output voltage of a voltage converter in accordance with the present invention.

As shown in FIG. 2, the voltage converter 130 is a switch-mode DC-DC converter in accordance with an embodiment of the present invention. The voltage converter 130 includes a power transistor 200 consisting of cascaded NMOS and PMOS transistors and a 2-step low pass filter 202 consisting of an inductance and a capacitor. The power transistor 200 is a switch. When duty cycle is logic high, the power transistor 200 is in conduction to a voltage source. When duty cycle is logic low, the power transistor 200 is grounded. Accordingly, the longer the logic of the input signal remains high (i.e., longer pulse width), the larger the average value of the output voltage $V_{out}$ of the voltage converter 130 will be.

Figure 3:
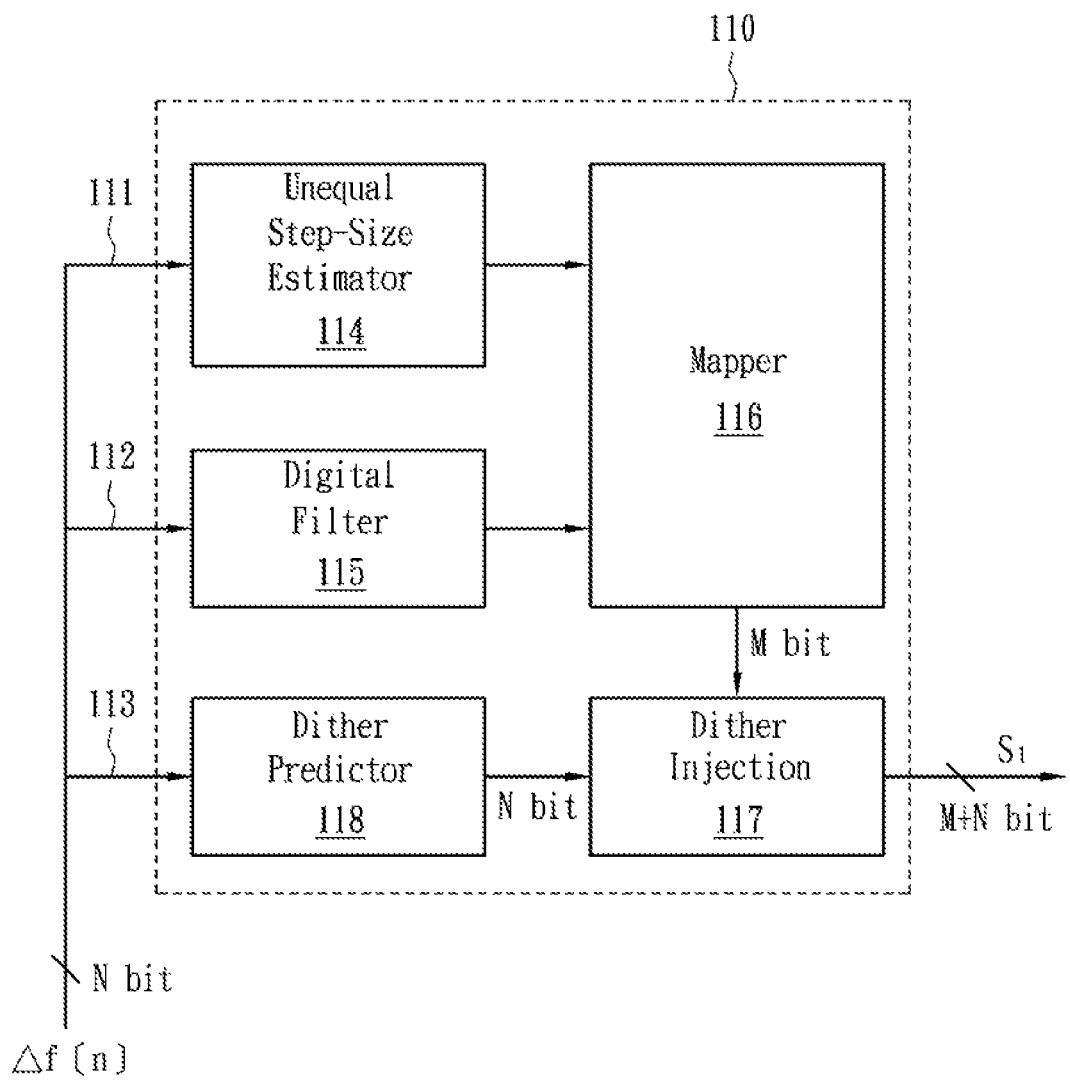
FIG. 3 is a diagrammatic illustration of a signal calculation circuit of the control system for dynamically adjusting an output voltage of a voltage converter in accordance with the present invention

FIG. 3 illustrates a preferred embodiment of the signal calculation circuit 110. The signal calculation circuit 110 essentially includes a transient enhanced path 111, a regulation path 112 and a resolution enhanced path 113. The transient enhanced path 111 comprises an unequal (adaptive) step-size estimator 114 for calculating varied steps based on the frequency error $\Delta f[n]$, so as to enhance transient speed. The regulation path 112 includes a digital filter 115 for providing accurate outputs through adjustment. The outputs of the transient enhanced path 111 and regulation path 112 are connected to a mapper 116 performing least significant portion (LSP) truncation and updating control duty ratio with M-bit resolution. The resolution enhanced path 113 includes a dither predictor 118 to determine whether the circuit is entering dither mode. After entering the dither mode, it undergoes dither injection to interpolate with the N-bit dither level for increasing pulse width resolution of the output signal and generates the modulation error $S_1$. More specifically, the signal calculation circuit 110 comprises two portions, one includes the estimator 114, the filter 115 and the mapper 116, the other includes the dither predictor 118. And the two portions are integrated to the dither injection 117 to generate $S_1$.

In accordance with traditional arrangement, dither is applied to digital PWM (DPWM) to reduce the loading thereof. For example, if the data conversion is at a speed of 1 MHz, DPWM needs a clock rate higher than 1 GHz to achieve 10-bit resolution. It is a challenge to the current digital circuit design.

According to the present invention, the dither operation is performed before PWM 120, i.e., the dither is embedded into the signal calculation circuit 110. The above-mentioned first portion is related to the control for M-bit resolution and the second portion is related to the processing for N-bit predicted interpolation. Then, the signals are combined by the dither injection 117, and the signal $S_1$ with an effective resolution of (M+N) bit is used to control the PWM 120. The unequal step-size estimator 114 and the mapper 116 can dynamically adjust and control gain to the error voltage encoded, and increase ability to trace the output voltage. The digital filter 115 functions as a PID filter to obtain a rough quantitative value for the output voltage in static status, and qualitatively judge whether error voltages occur.

The second portion is related to a predicted interpolation. When error voltages occur in a specific range of a target voltage, the predicted interpolation will be triggered. Meanwhile, the data stored in the data conversion register will be converted into a dither predicted control signal. The required interpolation control signal can be obtained by recombining the transient difference of the output voltage to adjust the resolution dynamically and perform predictive correction to the dither with minor variation, so as to effectively lower the power of the signal calculation circuit 110, the loading of the control signal $S_1$ to the PWM 120, as well as the complexity of the dither signal conversion. The effectiveness will be obvious when the invention is used for an application with output loading of a large range.

Figure 4:
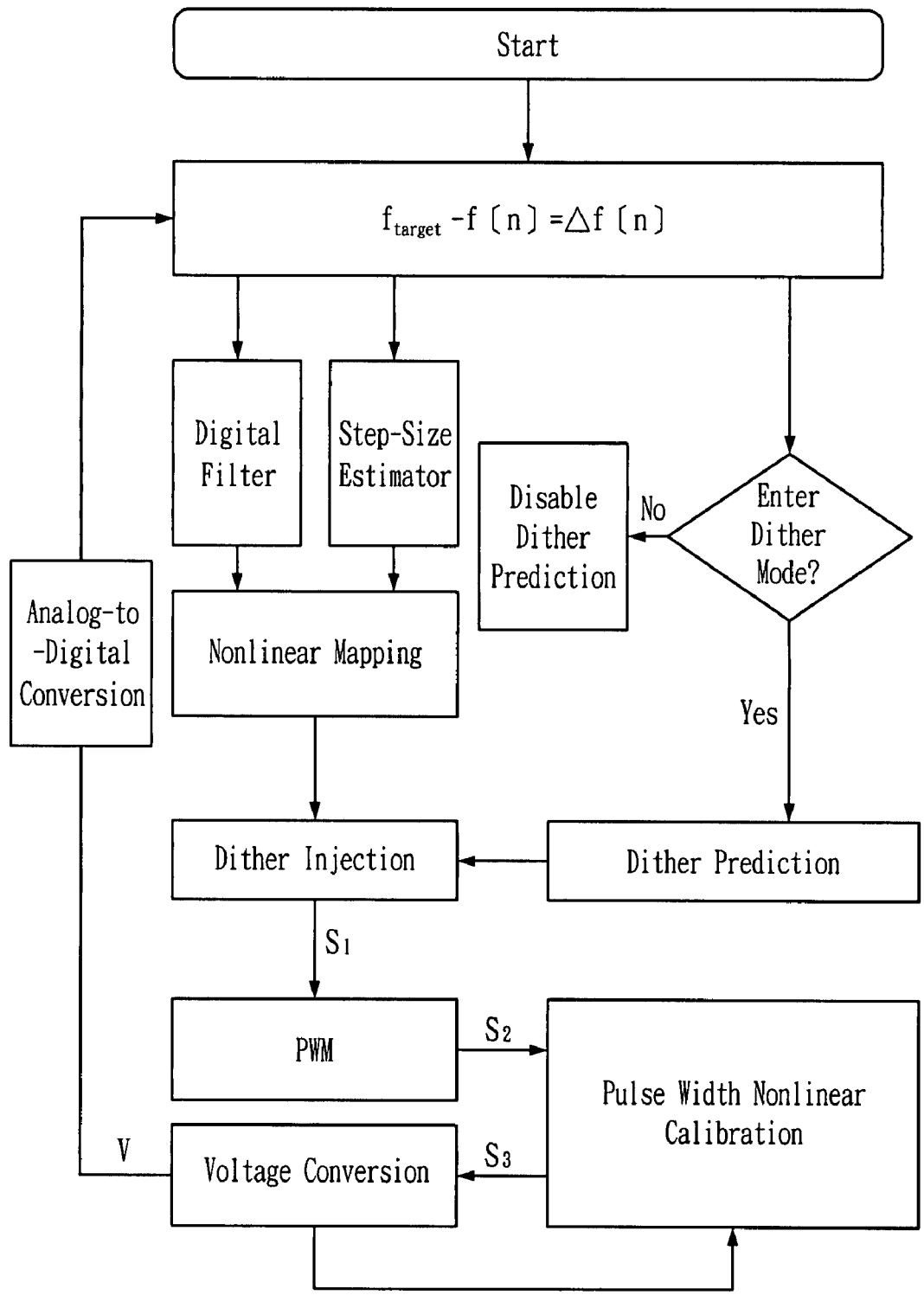
FIG. 4 is a diagrammatic illustration of the operation flow for dynamically adjusting an output voltage of a voltage converter in accordance with the present invention.

The operation flow of the control system for dynamically adjusting the output voltage of a voltage converter is shown in FIG. 4. First, frequency difference $\Delta f[n]$ is calculated, and nonlinear mapping is performed after digital filtering and step-size estimation, so as to perform LSP truncation and update duty ratio. Then, the determination is made as to whether dither mode is being entered. If so, dither prediction is performed followed by interpolation to enhance pulse width resolution of the output signal, i.e., dither injection is performed to increase interpolation performance. The pulse width modulation signal $S_2$ is thereby generated. Afterwards, the current of the voltage converter 130 is detected, and a nonlinear calibration signal $S_3$ based on the characteristics of the voltage converter 130 is generated. The voltage converter 130 simultaneously receives the pulse width modulation signal $S_2$ and the nonlinear calibration signal $S_3$ for voltage conversion and generates the output voltage $V_{out}$. The voltage $V_{out}$ is used for feedback control after analog-to-digital conversion.

Based on the invention that the first control loop (a long-tail control loop) performs predictive adjustment for pulse width for entire control system and the second control loop (a local pulse-squashing control loop) performs nonlinear calibration for the predicted pulse width, the output voltage of the voltage converter can be effectively and dynamically adjusted.

The above-described embodiments of the present invention are intended to be illustrative only. Numerous alternative embodiments may be devised by those skilled in the art without departing from the scope of the following claims.

We claim:

1. A control system for dyramically adjusting an output voltage of a voltage converter, the control system comprising:
   a first control loop having a signal processing circuit for synthesizing a pulse width modulation signal inputted to the voltage converter, said signal processing signal comprising:
      a voltage converter;
      a signal calculation circuit having a mapper performing a least significant portion truncation and an updating control duty ratio with M-bit resolution and a dither predictor for N-bit predicted interpolation; and
      a pulse width modulator receiving an output signal of said signal calculation circuit to generate the pulse width modulation signal for controlling the voltage converter, wherein said dither predictor generates a signal with an effective resolution of (M+N)-bit to said pulse width modulator; and
   a second control loop timely calibrating and squashing a pulse width of the pulse width modulation signal generated by said first control loop by detecting characteristics of the voltage converter.

2. The control system for claim 1, said signal calculation circuit further comprising:
   a transient enhanced path configured to provide accurate outputs through adjustment, wherein said transient enhanced path and said regulation path are connected to said mapper.

3. The control system in accordance with claim 2, wherein the transient enhanced path comprises an estimator for calculating step size.

4. The control system in accordance with claim 2, wherein the regulation path comprises a digital filter.

5. The control system in accordance with claim 2, wherein said signal calculation circuit further comprises a resolution enhanced path configured to determine whether a dither mode is entered.

6. The control system in accordance with claim 5, wherein the resolution enhanced path comprises said dither predictor for N-bit predicted interpolation.

7. The control system in accordance with claim 6, wherein the signal calculation circuit further comprises a dither injection unit to combine signals from the mapper and said dither predictor.

8. The control system in accordance with claim 1, wherein the first control loop further comprises a signal converter converting the output signal of the voltage converter to a detection value.

9. The control system in accordance with claim 8, wherein the signal calculation circuit simultaneously receives a target value and the detection value outputted from the signal converter to generate an error value for adjusting the pulse width modulation signal.

10. The control system in accordance with claim 9, wherein the signal calculation circuit generates the error value by digital signal processing.

11. The control system in accordance with claim 8, wherein the target value is produced from an analog or digital interface.

12. The control system in accordance with claim 8, wherein the signal calculation circuit interpolates to increase pulse width resolution of an output signal with the error value.

13. The control system in accordance with claim 12, wherein the signal calculation circuit uses dither injection to increase interpolation performance.

14. The control system in accordance with claim 8, wherein the voltage converter and the signal converter and the signal calculation circuit and the pulse width modulator are connected in series to create negative feedback and to form the first control loop.

15. The control system in accordance with claim 8, wherein the signal converter comprises an analog-to-digital converter to generate the detection value.

16. The control system in accordance with claim 1, wherein the pulse width modulator uses digital signals to synthesize desired pulse widths.

17. The control system in accordance with claim 1, wherein the second control loop comprises the voltage converter and a nonlinear calibration circuit, the nonlinear calibration circuit generates a nonlinear calibration signal, and the voltage converter simultaneously receives the pulse width modulation signal and the nonlinear calibration signal to generate an output voltage.

18. The control system in accordance with claim 1, wherein the characteristics of the voltage converter is the current or voltage of the voltage converter.

19. The control system in accordance with claim 1, wherein the voltage converter is a switch-mode DC-DC converter.

* * * * *